(12) United States Patent
Di Cesare et al.

(10) Patent No.: US 6,926,633 B2
(45) Date of Patent: Aug. 9, 2005

(54) TOOTHED BELT

(75) Inventors: Danilo Di Cesare, Pescara (IT);
Marino Petaccia, Lettomanoppello (IT)

(73) Assignee: Carlisle Power Transmission S.R.L., Colonnella (IT)

( * ) Notice: Subject to any disclaimer, the term of this patent is extended or adjusted under 35 U.S.C. 154(b) by 297 days.

(21) Appl. No.: 10/260,222

(22) Filed: Sep. 27, 2002

(65) Prior Publication Data

US 2003/0211912 A1 Nov. 13, 2003

(30) Foreign Application Priority Data

May 10, 2002 (IT) .................................... TO2002A0398

(51) Int. Cl.⁷ ................................................ F16G 1/28
(52) U.S. Cl. ...................................... 474/266; 474/260
(58) Field of Search ............................. 474/260, 263, 474/266, 267

(56) References Cited

U.S. PATENT DOCUMENTS

| | | | | |
|---|---|---|---|---|
| 3,790,403 A | * | 2/1974 | Ribbans, III | 442/180 |
| 4,626,232 A | * | 12/1986 | Witt | 474/205 |
| 4,632,665 A | * | 12/1986 | Skura | 474/205 |
| 4,740,192 A | * | 4/1988 | Mashimo et al. | 474/263 |
| 4,832,673 A | * | 5/1989 | Nagai et al. | 474/263 |
| 5,853,849 A | * | 12/1998 | Nishio et al. | 428/143 |
| 6,159,121 A | * | 12/2000 | Di Giacomo et al. | 474/205 |
| 6,419,775 B1 | * | 7/2002 | Gibson et al. | 156/137 |

* cited by examiner

*Primary Examiner*—David A. Bucci
*Assistant Examiner*—Vicky A. Johnson
(74) *Attorney, Agent, or Firm*—Sheridan Ross PC

(57) ABSTRACT

Described herein is a toothed belt comprising: a body made of elastomeric material having teeth on one of its surfaces; a coating fabric adherent to the surface of the teeth; and resistant inserts capable of having a high power of transmission, obtained by means of appropriate selection of parameters. The toothed belt according to the invention comprises a body formed by a mixture with a hardness value, after vulcanization, of between 90 and 97 shoreA, preferably made of chloroprene: the fabric is formed by at least one layer of fibers with a weight of between 700 and 1250 grams per square meter of surface, and preferably is a 6/6 textured polyamide, and the resistant inserts are made of glass fibers with a mean diameter of between 2.4 and 3 mm and are formed starting from basic filaments having a mean diameter of between 6 and 10 µm, which are preferably formed for at least 75 wt % of basic filaments having a mean diameter of 9 µm.

19 Claims, 2 Drawing Sheets

TOOTHED BELT

The present invention relates to a high-performance toothed belt.

BACKGROUND OF THE INVENTION

Toothed belts comprise a body made of elastomeric material having teeth on one of their surfaces, a coating fabric adherent to the surface of the teeth and resistant inserts, hereinafter also referred to as cords, inside the body.

Each component of the belt contributes to increasing the performance thereof in terms of strength, so as to reduce the risk of breaking of the belt and increase the specific power of transmission.

The coating fabric of toothed belts protects the working surface of the belt from wear due to rubbing between the sides of the teeth of the belt and the sides of the slots of the pulley with which the belt interacts and meshes. In addition, the coating fabric prevents the substances present in the environment in which the toothed belt works from possibly damaging it, and reduces the deformability of the teeth and the coefficient of friction on the working surface, i.e., the area of contact between belt and pulley during meshing.

Known is the use of a coating fabric consisting of a single layer, for example, having a weight of between 100 and 500 grams per square meter of surface of fabric, in order to ensure the necessary resistance to abrasion, maintaining an adequate flexibility of the belt when it is winding onto the pulley. Alternatively, also known is the use of a coating made up of a double layer of fabric for improving the characteristics of belt strength and for increasing the operating life of the toothed belt.

The resistant inserts of high performance belts in terms of power of transmission, i.e., for belts that have a specific power of transmission of higher than 25 kW per cm of width, are currently made with steel cords or aramidic-fibre cords, for example, the ones available on the market with the trademarks Kevlar® or Twaron®.

Aramidic fibres, as has been known for some time now, present, however, the disadvantage of having a dimensional stability over time that is very low; consequently, a belt of resistant inserts made of aramidic fibres, during storage, undergoes a shortening of its free development, with consequent alteration (i.e., reduction) of the initial pitch. As a result, during use, the belt is subjected to a higher load and higher stresses, which normally determine an early deterioration, triggered by the meshing error that is generated between the belt and the pulley. Furthermore, resistant inserts made of aramidic fibres require a particularly complex and costly adherization treatment for improving the dimensional stability over time of the resistant insert itself, and moreover, if this treatment is not carried out carefully, it also entails problems during cutting of the belts.

On the other hand, resistant inserts made of steel have a high dimensional stability over time but have a high specific weight and, furthermore, since the depositing of the reinforcement element takes place according to a helical pattern, during cutting of the belts these resistant elements partially come out of the side edges of the belt, with the risk of causing injury to operators during installation of the belt.

In order to prevent the above risk, it is therefore necessary to proceed to a further finishing step, which envisages removal of the strands of cords that protrude as a result of cutting and envisages manual sealing of all the edges of the belt using adhesive in the areas where the filaments partially protrude. This further finishing step involves considerable additional costs, in so far as it has to be carried out manually and has to be performed on each individual belt.

Furthermore, for high powers of transmission, on account of the problems of rapid wear of known rubber belts, there are still used systems of mechanical transmission employing chains or gears, which, however, present disadvantages in terms of weight, noise, maintenance costs and costs due to their complexity owing to the need for lubrication, whilst it would be advantageous to be able to use a rubber belt also for such applications.

SUMMARY OF THE INVENTION

The purpose of the present invention is therefore to provide a toothed belt that does not present the drawbacks described above and, in particular, a toothed belt having a high specific power of transmission, so as to be able to replace the mechanical drive systems currently in use.

It has surprisingly been found that a belt obtained by appropriately selecting certain constructional parameters enables all the drawbacks referred to above to be solved, as well as to have, at the same time, a high power of transmission.

According to the present invention, there is thus provided a toothed belt comprising a body made of elastomeric material having teeth on one of its surfaces, a coating fabric adherent to the surface of the teeth, and resistant inserts, the said belt being characterized in that:

said body comprises a main elastomer with a hardness value, after vulcanization, of between 90 and 97 shoreA and comprises at least one polymer chosen in the group consisting of acrylonitrile/butadiene, acrylonitrile, hydrogenated butadiene, chlorosulphonated polyethylene, chloroprene and polyurethane;

said fabric is formed by at least one layer of fibres and has a total weight of between 700 and 1250 g per square meter of surface;

said resistant inserts are made of glass fibres with a mean diameter of between 2.4 and 3 mm, are formed starting from basic filaments or strands having a mean diameter of between 6 and 10 $\mu$m, so that said belt altogether has a tensile strength of between 75,000 and 90,000 N over a basic width of the belt of 30 mm and by linear extrapolation hence between 25,000 and 30,000 N per cm of belt width.

BRIEF DESCRIPTION OF THE DRAWINGS

For a better understanding of the present invention, it will now be further described also with reference to the attached figures, in which.

DETAILED DESCRIPTION OF THE INVENTION

Figure 1:
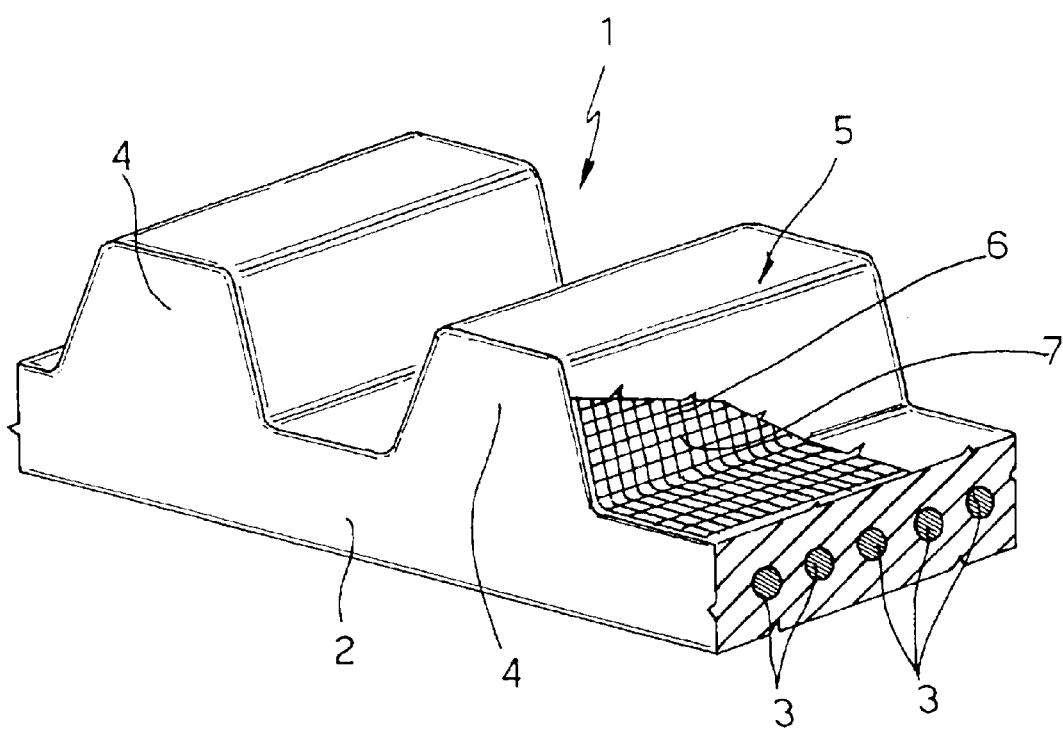
FIG. 1 is a partial perspective view of a toothed belt according to the present invention.

With reference to FIG. 1, the number 1 designates, as a whole, a toothed drive belt. The belt 1 comprises a body 2 made of elastomeric material, in which a plurality of longitudinal filiform resistant inserts 3 are embedded.

The body 2 has a toothing 4 which is coated with a coating fabric 5, which has weft threads 6 that extend in the longitudinal direction of the belt 1 and warp threads 7 oriented in the transverse direction of the belt 1.

The body 2 comprises a mixture of elastomeric material having a hardness, after vulcanization, of between 90 and 97 shoreA, measured according to the standard procedure envisaged by the ASTM standard 2240, with a measuring time of one second, obtained without recourse to the addition of reinforcement fibres.

The mixture of elastomeric material comprises a main elastomer, preferably chosen in the group made up of acrylonitrile/butadiene, acrylonitrile/hydrogenated butadiene, chlorosulphonated polyethylene, ethylene-propylene-diene terpolymer (EPDM), and chloroprene.

Even more preferable is a mixture having a chloroprene or polyurethane base, i.e., a mixture containing more than 80% of chloroprene or polyurethane, where by polyurethane is meant a bicomponent mixture by injection or a thermoplastic by extrusion.

The mixture of elastomeric material may contain, in addition to the main elastomer, conventional additives such as reinforcement agents, fillers, pigments, stearic acid, accelerators, vulcanization agents, antioxidants, activators, initiators, plasticizing agents, wax, pre-vulcanization inhibitors, and the like. For instance, as filler a white filler or carbon black may be used, this generally being added in an amount of between 5 and 200 phr, preferably, approximately 70 phr. There may also be added talc, calcium carbonate, silica and the like in amounts of generally between 5 and 150 phr or dispersions in oil containing fillers. It is possible to use organosilanes in amounts of between 0.1 and 20 phr. It is possible to use sulphur-donor vulcanization agents, for example aminodisulphides and polymeric polysulphides, or free sulphur. The amount added varies according to the type of rubber and the type of vulcanization agent used, and is generally between 0.1 and 10 phr. Amongst the antidegrading agents most widely used in the composition of the mix there are microcrystalline waxes, paraffin waxes, monophenols, bisphenols, thiophenols, polyphenols, derivatives of hydroquinone, phosphites, mixtures of phosphates, thioesters, naphthyl amines, diphenol amines, derivatives of substituted and non-substituted diaryl amines, diarylphenylene diamines, paraphenylene diamines, quinolines, and mixtures of amines. The antidegrading agents are generally used in amounts of between 0.1 and 10 phr. Representatives of process oils that can be used are dithiobisbenzanilide, polyparadinitrosobenzene, xilyl mercaptans, polyethylene glycol, petroleum oils, vulcanized vegetable oils, phenolic resins, synthetic oils, petroleum resins, and polymeric esters. The process oils can be used in conventional quantities between 0 and 70 phr. Amongst the initiators, stearic acid is conventionally used in amounts of between 1 and 4 phr. Conventional additives may also be added, such as calcium oxide, zinc oxide and magnesium oxide, generally in amounts of between 0.1 and 15 phr. Conventional accelerators are also used, or combinations of accelerators such as amines, disulphides, guanidine, thiourea, thiasols, thiols, sulphenamides, dithiocarbamates, and xanthates, generally in amounts of between 0.1 and 15 phr. Reinforcement compounds may also be added in amounts preferably of between 10 and 20 phr.

The coating fabric 5 of the toothed belt 1 may consist of one or more layers, and has a total weight, made up of the weight of the sum of the layers that form the raw fabric, plus that of the treatments to which the raw fabric has been subjected, of between 700 and 1250 g per square meter of surface. The total weight is even more preferably between 700 and 1100 g/m$^2$, when it is made up of a single layer, and between 850 and 1250 g/m$^2$, when it is made up of a double layer.

In the case where it is formed by a single layer it may, for example, be obtained using the weaving technique known as 2×2 twill, and has a total thickness of between 230 and 280 mm and consists of a weft comprising first threads and second threads interwoven together. The first threads have a count of 4×110 and are made up of a number of primary strands of 4×34, and the second threads have a count of 6×78 and are made up of a number of primary strands of 6×34.

The first and second threads consist of a polymeric material, preferably aliphatic or aromatic polyamide and, even more preferably, 6/6 polyamide and, in detail, the first threads are made of medium-toughness 6/6 polyamide and the second threads are made of high-toughness 6/6 polyamide, for a greater resistance to wear.

The fabric 5 may moreover consist of two layers and, in this case, has a total thickness of between 1.8 and 2.3 mm. The two combined layers of fabric are each made, both as regards the weft and as regards the warp, with threads made of a polymeric material, preferably aliphatic or aromatic polyamide, even more preferably, 6/6 polyamide and, in particular, high-toughness 6/6 polyamide.

The coating fabric 5 is, in any case, chosen in such a way as to have a tensile strength in the non-elastic direction (warp) of between 3000 and 5500 N over 25 mm of width, and an extensibility in the elastic direction (weft) of between 130 and 180%. The coating fabric 5 is generally treated with an adhesive, in particular rorcinol-formaldehyde latex (RFL), preferably in an amount of between 25 and 35 wt %, in order to improve adhesion of the fabric 5 to the body 2 and resistance to abrasion of the belt 1 as a whole.

After treatment with RFL, the fabrics are subjected, in a conventional way, to successive steps of spreading with mixes preferably of the same type as described previously for the body of the belt. The fabric 5 acquires a high degree of antistaticness, which is sufficient and necessary for meeting the requirements contemplated by the reference standard for toothed belts, namely the standard BSI2050, a 50% modulus, i.e., the tensile force necessary for lengthening the original dimension of the specimen of fabric by 50%, of between 70 and 200 N over 50 mm of width. The resistant inserts 3 are made of high-modulus glass fibres, starting from basic filaments having a mean diameter of between 6 and 10 $\mu$m, for example, the ones available on the market under the name of K Glass or U Glass, manufactured by NGF, or S-Glass, manufactured and marketed by Asahi.

Preferably, basic filaments having a mean diameter of 9 $\mu$m are used, in an amount greater than 75% of the total weight of the resistant inserts 3 themselves. The above basic filaments undergo a treatment based upon an adhesive composition, for example RFL, which brings the diameter of the filament to a size preferably between 0.006 and 0.012 mm. Consequently, a number of between 150 and 250 of these basic filaments or strands are joined together to obtain a single thread and then in groups of nine twisted together in a first direction, so as to obtain a first basic twisted yarn. Finally, seventeen of these basic twisted yarns are then twisted in a second direction opposite to the first direction to obtain the resistant insert or cord.

The resistant insert or cord has a total diameter of between 2.4 and 3 mm and a number of twists of approximately 40±6 per linear meter of cord and a weight of between 600 and 700 grams per hundred meters.

The resistant insert thus obtained is then deposited on the mould for construction of the belt with a spiralling pitch of between 2.7 and 3.2 mm, so obtaining a number of turns of between 7 and 11 for every 3 cm of width of the toothed belt itself. In this way, it emerges that the tensile strength of the belt is between 25,000 and 30,000 N per cm of width, with an extensibility of less than 4.5%.

Surprisingly, it has been found that, by selecting the combination of resistant inserts 3, coating fabric 5 and elastomeric material constituting the body, as described previously, a belt capable of having on the pulleys a high power of transmission is obtained, in particular when the pitch of the belt is between 12 and 17 mm.

In particular, in the case where the pitch of the belt is 14 mm, with a width of 40 mm and the pulley being used has 80 teeth, the maximum power of transmission at 1700 r.p.m. is 257 kW (64 kW per cm of width), with an increase of 50% as compared to toothed belts currently in use.

The belt according to the present invention can be made using common methods for manufacturing toothed belts.

From an examination of the characteristics of the toothed belt made according to the present invention, the advantages that it affords are evident. In particular, thanks to the high power of transmission, the belt may be used also for replacing mechanical systems currently in use. In addition, thanks to the particular combination of the parameters of construction, it is possible to avoid the drawbacks connected to the use of cords made of aramidic fibres and steel fibres and, in particular, the addition of further very costly finishing steps, in this way simplifying also the cutting process.

The toothed belt according to the present invention will now be described also with reference to examples, without thereby limiting the scope of the invention to the said examples.

EXAMPLE 1

Table 1 gives the composition of the mix constituting the body 2 of a toothed belt A according to the invention. The said belt is found to have a hardness, measured after vulcanization, of 93–94 shoreA, whilst the comparison belt B has a hardness of 88–90 shoreA.

TABLE 1

|  | Composition A Amount (phr) | Composition B Amount (phr) |
| --- | --- | --- |
| Chloroprene | 100 | 100 |
| White filler/carbon black | 70 | 56 |
| Diphenylamine oxylate | 6 | 6 |
| Zinc oxide | 7 | 8.5 |
| Stearic acid | 9.5 | 4.6 |
| Resorcinol | 8 | 8 |
| Reinforcing components | up to 20 | up to 8 |

EXAMPLE 2

Table 2 gives the characteristics of the weft and warp of a coating fabric 5 of a toothed belt 1 according to the present invention.

TABLE 2

| Characteristics of the weft | |
| --- | --- |
| Construction of the weft | Double layer of threads of weft of textured 6/6 polyamide |
| First layer of weft | medium-toughness 6/6 polyamide |
| Count (dtex) | 4 × 110 |
| Number of strands | 4 × 34 |
| Second layer of weft | high-toughness polyamide |
| Count (dtex) | 6 × 78 |
| Number of strands | 6 × 34 |
| Picks (number/25 mm) | 98 ± 3 |
| Tensile strength (N/25 mm) | >1500 |
| Extensibility (%) | 170 ± 10 |
| Elongation at 100 N (%) | 90 ± 10 |
| Characteristics of the warp | |
| Construction of the warp | Single layer of high-toughness 6/6 polyamide |
| Count (dtex) | 940 |
| Number of strands | 140 |
| Ends (number/25 mm) | 105 ± 3 |
| Tensile strength (N/25 mm) | >5000 |
| Extensibility (%) | >25 |

Polyamide in fabric: 60% high-toughness, 40% medium-toughness

EXAMPLE 3

Table 3 gives the characteristics of resistant inserts or cords (3) used for the manufacture of a toothed belt A according to the invention and of comparison belts B and C made, respectively, with resistant inserts made of glass fibres of a conventional type and ones made of aramide.

TABLE 3

|  | A | B | C |
| --- | --- | --- | --- |
| Number of basic strands | 180–220 | 720–880 | 720–880 |
| Diameter of individual strand | 9 | 9 | 12 |
| First twisting (twists/25 mm) | 2 | 2 | 2.5 |
| Final twisting in opposite direction (T/25 mm) | 1 ± 0.2 | 1 ± 0.3 | 1.1 |
| Primary twist/final twist ratio | 2 | 2 | 2.27 |
| Final diameter of cord (mm) | 2.65 ± 0.15 | 2.47 ± 0.15 | 2.66 ± 0.10 |
| Final tensile strength of cord (daN) | 525 ± 25 | 300 ± 50 | 630 ± 30 |
| Extensibility (%) | 4.5 ± 0.5 | 3.5 ± 1.0 | 3.5 ± 0.5 |
| Elongation at 100 daN (%) | max 1.8 | max 1.8 | max 1.0 |
| Weight (g/100 m) | 690 ± 10 | 630 ± 30 | 480 ± 20 |

EXAMPLE 4

Table 4 gives the values obtained from a number of tests conducted on a belt made according to the present invention.

TABLE 4

|  | Values found with standard tests |
| --- | --- |
| Tensile strength (N) | 81700 |
| Extensibility (%) | 4.5 |

TABLE 4-continued

| | Values found with standard tests |
|---|---|
| Mix/cord adhesion (N/cm) | 200 |
| Pdl (mm) two fabrics | 1.42 |
| Pdl (mm) one fabric | 1.37 |
| Creep test (% creep after 12 h) | −9% max |

The width of the belt tested was 30 mm.

EXAMPLE 5

Figure 2:
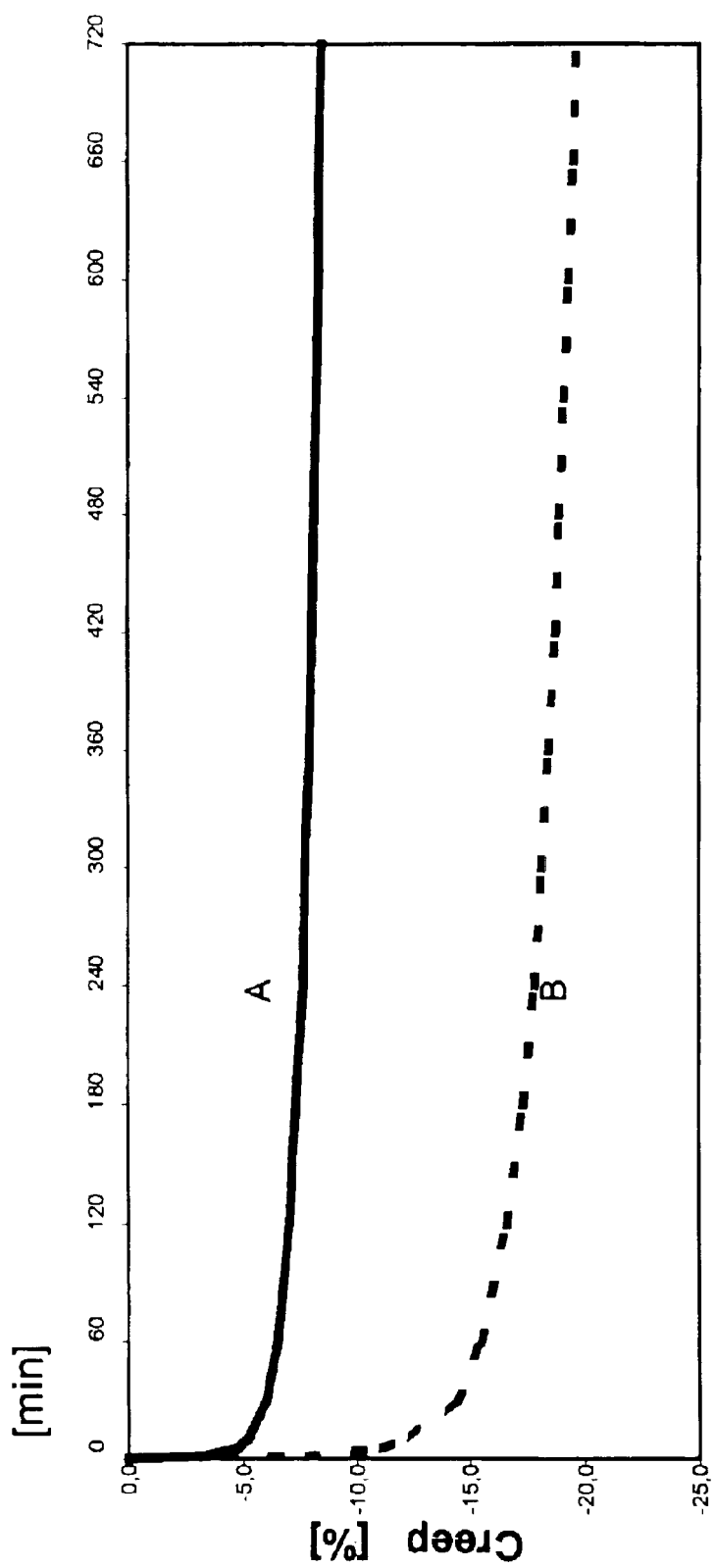
FIG. 2 is a creep test conducted on the toothed belt according to the invention and on a comparison belt.

The graph appearing in FIG. 2 shows the values obtained from a creep test using a belt according to the present invention (curve A) and a comparison belt (curve B), the latter, however, comprising a mix according to what is given in Table 1 (belt B) and having resistant inserts or cords made of aramidic fibres.

The test was carried out on a 50,000-N torque meter, with two toothed pulleys with 24 teeth, on which was mounted a belt with a pitch of 14 mm and a width of 15 mm, an axial load of 14,000 N being applied to the belt. Then, the distance between centres was blocked and the creep data (in %) were recorded continuously for 12 hours. The graph gives the values obtained at 16-minute intervals.

What is claimed is:

1. A toothed belt comprising: a body made of elastomeric material having teeth on one of its surfaces; a coating fabric adherent to the surface of the teeth; and resistant inserts or cords; said toothed belt being characterized in that:

said body comprises a main elastomer with a hardness value, after vulcanization, of between 90 and 97 shoreA, and comprises at least one polymer chosen from the group consisting of acrylonitrile/butadiene, acrylonitrile, hydrogenated butadiene, chlorosulphonated polyethylene, chloroprene and polyurethane;

said fabric is formed by at least one layer of fibres and has a total weight of between 700 and 1250 grams per square meter of surface;

said resistant inserts or cords are made of glass fibres with a mean diameter of between 2.4 and 3 mm, said resistant insert or cords being formed from basic filaments having a mean diameter of between 6 and 10 μm, so that said belt altogether has a tensile strength of between 25,000 and 30,000 N per cm of belt width.

2. The toothed belt according to claim 1, characterized in that each individual resistant insert is set with a spiralling pitch of between 7 and 11 turns for every 30 mm of belt width, and in that each individual resistant insert has a tensile strength of between 4500 and 5500 N.

3. The toothed belt according to claim 2, characterized in that said resistant inserts consist, of at least 75 wt %, of basic filaments having a diameter of 9 μm.

4. The toothed belt according to claim 3, characterized in that each said resistant insert is formed by:

a number of between 150 and 250 basic filaments to form first yarns;

twisting 9 first yarns in a first direction to form first twisted yarns;

twisting 17 first twisted yarns in a second direction opposite to said first direction.

5. The toothed belt according to claim 1, characterized in that said body is made at least 80% by weight of chloroprene.

6. The toothed belt according to claim 1, characterized in that said body is made of at least 80% by weight of polyurethane.

7. The toothed belt according to claim 1, characterized in that said fabric comprises a single layer and has a total weight of between 700 and 1100 g/m² and has a total thickness of between 2.3 and 2.8 mm.

8. The toothed belt according to claim 7, characterized in that said fabric is woven using a 2×2 twill technique.

9. The toothed belt according to claim 8, characterized in that said fabric comprises textured fibres.

10. The toothed belt according to claim 9, characterized in that said fabric comprises polyamide fibres.

11. The toothed belt according to claim 10, characterized in that said fabric comprises 6/6 polyamide fibres.

12. The toothed belt according to claim 11, characterized in that said fabric comprises two different 6/6 polyamide fibres having different toughnesses.

13. The toothed belt according to claim 1, characterized in that said fabric comprises a double layer and has a total weight of between 850 and 1250 g/m² and a total thickness of between 1.8 and 2.3 mm.

14. The toothed belt according to claim 13, characterized in that said fabric comprises textured fibres.

15. The toothed belt according to claim 14, characterized in that said fabric comprises polyamide fibres.

16. The toothed belt according to claim 15, characterized in that said fabric comprises 6/6 polyamide fibres.

17. The toothed belt according to claim 16, characterized in that said fabric comprises two different 6/6 polyamide fibres having different toughnesses.

18. The toothed belt according to claim 1, characterized in that said belt has a pitch of between 12 and 17 mm.

19. The toothed belt according to claim 1, characterized in that said belt has a pitch of 14 mm.

* * * * *